US011240204B2

(12) United States Patent
Patil et al.

(10) Patent No.: US 11,240,204 B2
(45) Date of Patent: Feb. 1, 2022

(54) SCORE-BASED DYNAMIC FIREWALL RULE ENFORCEMENT

(71) Applicant: VMWARE, INC., Palo Alto, CA (US)

(72) Inventors: Rayanagouda Bheemanagouda Patil, Pune (IN); Vasantha Kumar, Pune (IN); Sriram Gopalakrishnan, Pune (IN); Mandar Barve, Pune (IN)

(73) Assignee: VMWARE, INC., Palo Alto, CA (US)

( * ) Notice: Subject to any disclaimer, the term of this patent is extended or adjusted under 35 U.S.C. 154(b) by 178 days.

(21) Appl. No.: 16/383,692

(22) Filed: Apr. 15, 2019

(65) Prior Publication Data
US 2020/0236086 A1 Jul. 23, 2020

(30) Foreign Application Priority Data

Jan. 23, 2019 (IN) .............................. 201941002816

(51) Int. Cl.
*H04L 29/06* (2006.01)
*H04L 12/715* (2013.01)
*G06F 9/455* (2018.01)

(52) U.S. Cl.
CPC ...... *H04L 63/0263* (2013.01); *G06F 9/45558* (2013.01); *H04L 45/64* (2013.01); *H04L 63/1416* (2013.01); *G06F 2009/45587* (2013.01)

(58) Field of Classification Search
CPC . H04L 63/0263; H04L 45/64; H04L 63/1416; G06F 9/45558; G06F 2009/45587
See application file for complete search history.

(56) References Cited

U.S. PATENT DOCUMENTS

| | | | | |
|---|---|---|---|---|
| 10,284,595 | B2 * | 5/2019 | Reddy | H04L 63/1425 |
| 10,554,493 | B2 * | 2/2020 | Kompella | H04L 41/0686 |
| 10,698,714 | B2 * | 6/2020 | Krishnamurthy | G06F 9/45558 |
| 10,701,104 | B2 * | 6/2020 | Malkov | G06F 9/45558 |
| 2013/0298242 | A1 * | 11/2013 | Kumar | G06F 21/564 |
| | | | | 726/25 |
| 2015/0281277 | A1 * | 10/2015 | May | H04L 63/10 |
| | | | | 726/1 |
| 2016/0330236 | A1 * | 11/2016 | Reddy | H04L 63/1425 |
| 2016/0359697 | A1 * | 12/2016 | Scheib | G06N 99/00 |
| 2016/0359872 | A1 * | 12/2016 | Yadav | H04L 43/0894 |
| 2016/0359917 | A1 * | 12/2016 | Rao | H04L 43/0882 |
| 2017/0026283 | A1 * | 1/2017 | Williams | H04L 45/74 |
| 2017/0054685 | A1 * | 2/2017 | Malkov | H04L 63/0227 |
| 2017/0364702 | A1 * | 12/2017 | Goldfarb | H04L 63/14 |

(Continued)

*Primary Examiner* — Joseph P Hirl
*Assistant Examiner* — Stephen T Gundry
(74) *Attorney, Agent, or Firm* — Su IP Consulting

(57) ABSTRACT

Example methods and systems for score-based dynamic firewall rule enforcement in a software-defined networking (SDN) environment. One example method may comprise in response to detecting a first request to access a first resource, identifying a first score associated with the user, and a firewall rule that is applicable to the user based on information associated with the user. The firewall rule may be applied to allow access to the first resource. The method may further comprise adjusting the first score to a second score that represents a more restrictive access level compared to the first score. In response to detecting a second request to access the first resource, applying the firewall rule to block the second request based on the second score.

25 Claims, 6 Drawing Sheets

(56) References Cited

U.S. PATENT DOCUMENTS

| | | | |
|---|---|---|---|
| 2018/0026944 A1* | 1/2018 | Phillips | H04L 63/1433 |
| | | | 726/4 |
| 2018/0181423 A1* | 6/2018 | Gunda | H04L 63/0236 |
| 2018/0181763 A1* | 6/2018 | Gunda | G06F 21/50 |
| 2018/0183764 A1* | 6/2018 | Gunda | G06F 9/06 |
| 2018/0295036 A1* | 10/2018 | Krishnamurthy | G06F 11/3006 |
| 2018/0367396 A1* | 12/2018 | Kompella | H04L 41/0859 |
| 2018/0367398 A1* | 12/2018 | Pani | H04L 41/0873 |
| 2018/0367413 A1* | 12/2018 | Kompella | H04L 41/22 |
| 2019/0081852 A1* | 3/2019 | Nazar | H04L 41/0613 |
| 2019/0081871 A1* | 3/2019 | Nazar | H04L 43/0823 |
| 2019/0230064 A1* | 7/2019 | Soman | H04L 47/20 |
| 2019/0230126 A1* | 7/2019 | Kumar | H04L 45/64 |
| 2019/0356697 A1* | 11/2019 | Chougule | H04L 63/20 |
| 2020/0007583 A1* | 1/2020 | Dixit | H04L 63/20 |
| 2020/0007584 A1* | 1/2020 | Dixit | H04L 43/08 |
| 2020/0110878 A1* | 4/2020 | Hu | G06F 9/45558 |
| 2020/0225964 A1* | 7/2020 | Soman | G06F 9/452 |
| 2020/0236037 A1* | 7/2020 | Shu | H04L 43/026 |
| 2020/0287932 A1* | 9/2020 | Malkov | H04L 63/1466 |
| 2020/0334068 A1* | 10/2020 | Krishnamurthy | G06F 11/3466 |

\* cited by examiner

SCORE-BASED DYNAMIC FIREWALL RULE ENFORCEMENT

RELATED APPLICATIONS

Benefit is claimed under 35 U.S.C. 119(a)-(d) to Foreign Application Serial No. 201941002816 filed in India entitled "SCORE-BASED DYNAMIC FIREWALL RULE ENFORCEMENT", on Jan. 23, 2019, by VMWARE, Inc, which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtual machines running different operating systems may be supported by the same physical machine (also referred to as a "host"). Each virtual machine is generally provisioned with virtual resources to run an operating system and applications. The virtual resources may include central processing unit (CPU) resources, memory resources, storage resources, etc. In order to meet requirements of granularity and scalability in the SDN environment, a firewall engine may be deployed on each host to protect VMs against security threats. For example, after a user logs into a particular VM to access various resources in the SDN environment, the firewall engine may be configured to filter traffic to and from the VM. However, there is a risk that the user and associated VM may become rogue, which exposes other entities to malicious attacks.

DETAILED DESCRIPTION

Figure 1:
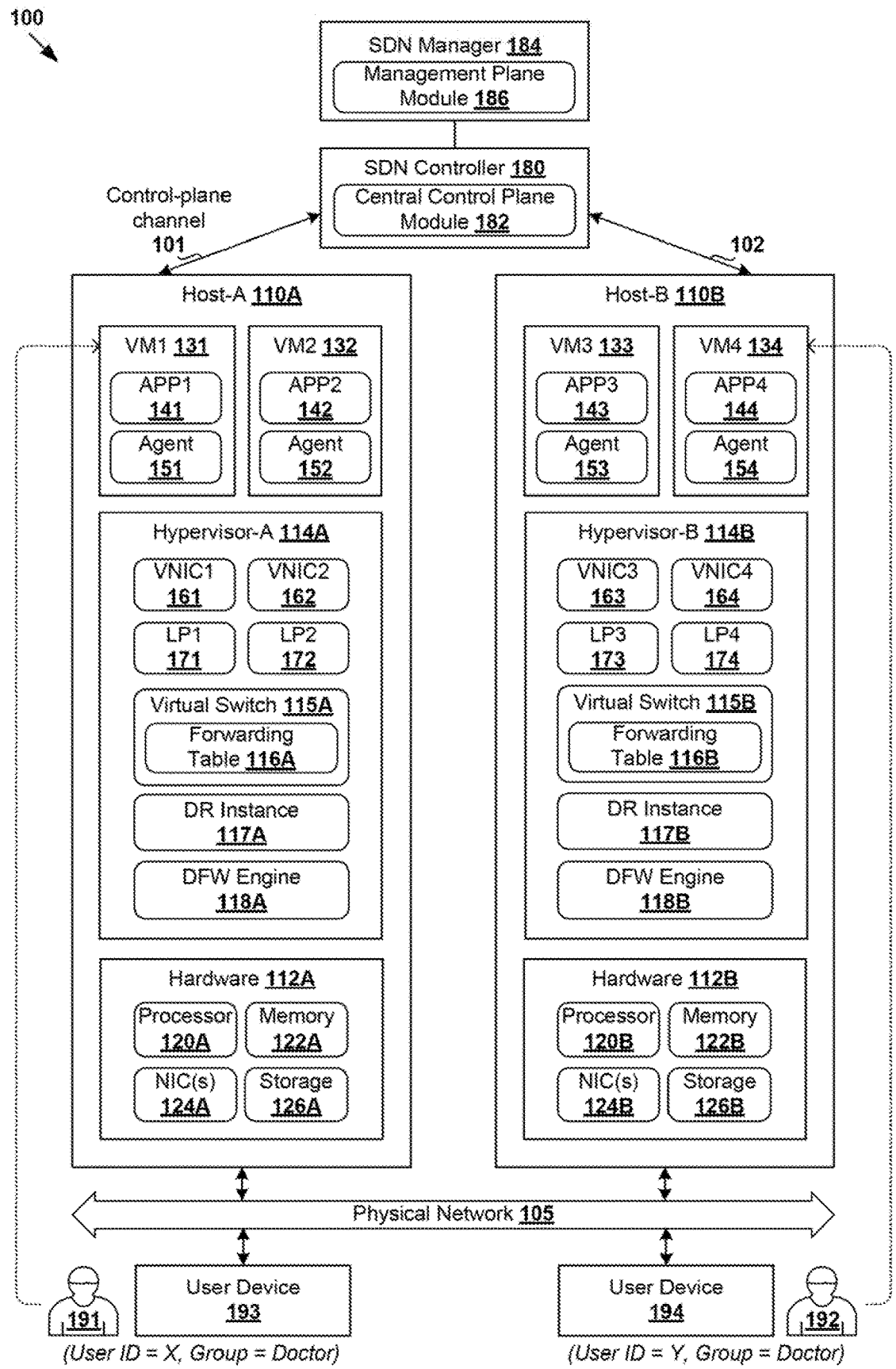
FIG. 1 is a schematic diagram illustrating an example software-defined networking (SDN) environment in which score-based dynamic firewall rule enforcement may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to data center security will now be explained in more detail using FIG. 1, which is a schematic diagram illustrating example software-defined networking (SDN) environment 100 in which score-based dynamic firewall rule enforcement may be performed. It should be understood that, depending on the desired implementation, SDN environment 100 may include additional and/or alternative components than that shown in FIG. 1. SDN environment 100 includes multiple hosts 110A-B that are interconnected via physical network 105. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B may include suitable hardware 112A/112B and virtualization software (e.g., hypervisor-A 114A, hypervisor-B 114B) to support various VMs. For example, hosts 110A-B may support respective VMs 131-134. Hypervisor 114A/114B maintains a mapping between underlying hardware 112A/112B and virtual resources allocated to respective VMs. Hardware 112A/112B includes suitable physical components, such as central processing unit(s) (CPU(s)) or processor(s) 120A/120B; memory 122A/122B; physical network interface controllers (NICs) 124A/124B; and storage disk(s) 126A/126B, etc.

Virtual resources are allocated to respective VMs 131-134 to support a guest operating system (OS; not shown for simplicity) and application(s) 141-144. For example, the virtual resources may include virtual CPU, guest physical memory, virtual disk, virtual network interface controller (VNIC), etc. Hardware resources may be emulated using virtual machine monitors (VMMs). For example in FIG. 1, VNICs 161-164 are virtual network adapters for VMs 131-134, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 171-174 are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM3 133 on host-B 110B may be connected to the same logical switch and located on the same logical layer-2 segment, such as a segment with VXLAN network identifier (VNI)=6000.

SDN controller 180 and SDN manager 184 are example network management entities in SDN environment 100. One example of an SDN controller is the NSX controller component of VMware NSX® (available from VMware, Inc.) that operates on a central control plane. SDN controller 180 may be a member of a controller cluster (not shown for simplicity) that is configurable using SDN manager 184 operating on a management plane. Network management entity 180/184 may be implemented using physical machine (s), VM(s), or both. Logical switches, logical routers, and logical overlay networks may be configured using SDN controller 180, SDN manager 184, etc. To send or receive control information, a local control plane (LCP) agent (not shown) on host 110A/110B may interact with central control plane (CCP) module 182 at SDN controller 180 via control-plane channel 101/102.

Hosts 110A-B may also maintain data-plane connectivity with each other via physical network 105 to facilitate communication among VMs located on the same logical overlay network. Hypervisor 114A/114B may implement a virtual tunnel endpoint (VTEP) (not shown) to encapsulate and decapsulate packets with an outer header (also known as a tunnel header) identifying the relevant logical overlay network (e.g., using a VXLAN (or "virtual" network identifier (VNI) added to a header field). For example in FIG. 1, hypervisor-A 114A implements a first VTEP associated with (IP address=IP-A, MAC address=MAC-A, VTEP label=VTEP-A), and hypervisor-B 114B a second VTEP with (IP-B, MAC-B, VTEP-B), etc. Encapsulated packets may be sent via an end-to-end, bi-directional communication path (known as a tunnel) between a pair of VTEPs over physical network 105.

To protect VMs 131-134 against security threats caused by unwanted packets, hypervisor 114A/114B implements distributed firewall (DFW) engine 119A/119B 118A/118B to filter packets to and from associated VMs. For example, at host-A 110A, hypervisor 114A implements DFW engine 118A to filter packets for VM1 131 and VM2 132. SDN controller 160 may be used to configure firewall rules that are enforceable by distributed firewall engine 118A/118B. In practice, network packets may be filtered according to firewall rules at any point along the datapath from a source (e.g., VM1 131) to a physical NIC (e.g., 124A). In one embodiment, a filter component (not shown) may be incorporated into each VNIC 161-164 to enforce firewall rules that are associated with the VM (e.g., VM1 131) corresponding to that VNIC (e.g., VNIC 161). The filter components may be maintained by DFW engines 118A-B.

One of the challenges in SDN environment 100 is improving the overall network security. Conventionally, firewall rules are generally defined using five tuples to match a specific packet flow, such as source IP address, source port number (PN), destination IP address, destination PN, and protocol, in addition to an action (e.g., allow or block). To achieve better security in SDN environment 100, identity-based firewall rules that are applicable to a specific user (or group of users) may be configured. In practice, network administrators may find it easier and more efficient to configure identity-based firewall rules. As a comparison, to achieve the same level of protection for a group of users, a large set of traditional firewall rules may be required to cover all possible 5-tuple combinations.

For example in FIG. 1, first user 191 (user ID=X) may log into VM1 131, and second user 192 (user ID=Y) into VM4 134 using respective user devices 193-194. Both users 191-192 are members of group=doctor, and an identity-based firewall rule may be configured for that group. To facilitate the enforcement of firewall rules by DFW engines 118A-B, identity information associated with user 191/192 may be gathered when user 191/192 logs in. During the login process, authentication is performed to verify the identity of user 191/192 based on any suitable credentials (e.g., user name, user identifier (ID) and password). However, once a user is authenticated (or an associated endpoint or application is assigned with a list of access permissions), it is challenging to evaluate whether the user or endpoint has gone rogue. This exposes SDN environment 100 to malicious activities that could lead to breach of security.

Dynamic Firewall Rule Enforcement

According to examples of the present disclosure, data center security may be improved by using a "score-based" approach to dynamically evaluate whether to allow or block access by user 191/192 to a particular resource. Instead of completely trusting user 191/192 once they have been authenticated, a score that reflects the trustworthiness associated with user 191/192 may be dynamically adjusted to restrict access. In contrast with conventional firewall rules based on 5-tuple matching, the score provides an added dimension to firewall decision making. This way, even after user 191/192 has gone rogue, a more restrictive security policy may be automatically enforced for that user without affecting other users, or requiring intervention by a network administrator.

Figure 2:
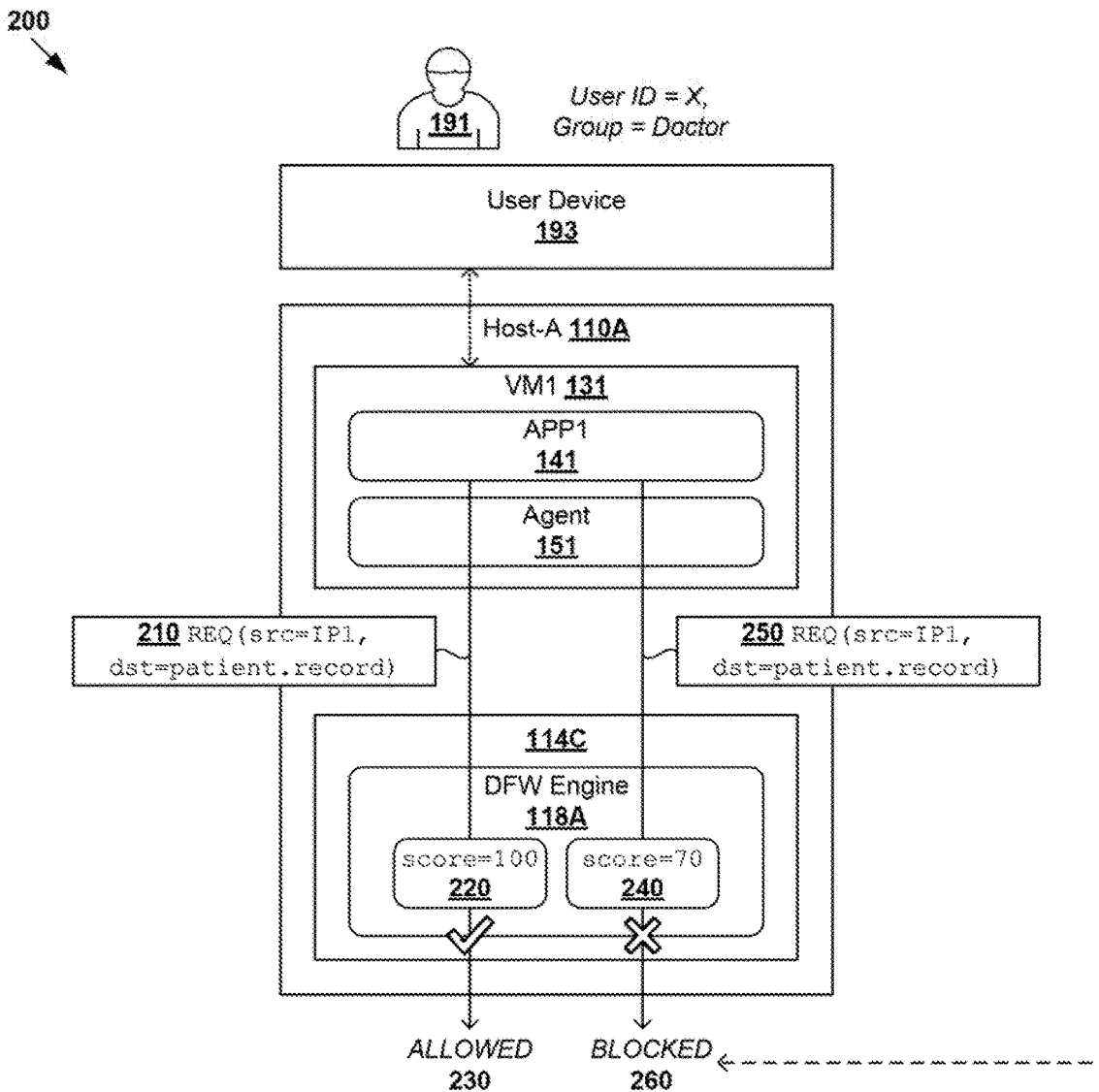
FIG. 2 is a schematic diagram illustrating an example score-based dynamic firewall rule enforcement in an SDN environment.

For example, FIG. 2 is a schematic diagram illustrating example score-based dynamic firewall rule enforcement 200 in SDN environment 100. According to mapping information (see 270), group=doctor includes members such as first user 191 (see 271) and second user 192 (see 272). A set of score-based firewall rules (see 280) may be configured for group=doctor such that they are applicable to both users 191-192. As used herein, the term "score" may refer generally to a measurable level of trust or reputation that may be used for firewall rule enforcement. For example, a higher score may be assigned to one user who is more trustworthy or reputable compared to another user who is suspected to be malicious. A "score associated with a user" may be assigned to the user (e.g., user 191/192), a virtualized computing instance or endpoint (e.g., VM 131/134) associated with the user, an application or process associated with the user (e.g., APP 141/144), a software-implemented or logical entity associated with the virtualized computing instance, or any combination thereof, etc. The score may be referred to as a trust score, reputation score, etc.

Referring to 281 in FIG. 2, a firewall rule is configured to block access to all resources for score that is less than 40. At 282, a firewall rule is configured to allow Internet access for score >40, such as using hyperText transfer protocol (HTTP), HTTP secure (HTTPS), etc. At 283-284 in FIG. 2, firewall rules are configured to allow access to file share services and vulnerable ports for score >50, such as TCP port 445, port 22 for secure shell (SSH) session, port 21 for file transfer protocol (FTP session), etc. At 285-286, firewall rules are configured to allow database access to patient records for score >75, and billing records for score=100. In these examples, a "resource" may be a vulnerable port (e.g., 22, 445), non-vulnerable port (e.g., 80), database (e.g., patient records), service (e.g., access to a service VM; not shown), etc. Based on the score, access privilege associated with a resource may be updated, such as to protect both file servers and local files inside a guest VM, etc.

The example in FIG. 2 will be explained using FIG. 3, which is a flowchart of example process 300 for a computer system to perform score-based dynamic firewall rule enforcement in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. Examples of the present disclosure may be implemented using any suitable network management entity 180/184 (e.g., using module 182/186), host 110A/110B (e.g., using DFW engine 118A/118B and/or agent 151/152 running on VM 131/132), etc. Throughout the present disclosure, it should be understood that although the terms "first" and "second" are used to describe various elements, these elements should not be limited by these terms. These terms are used to distinguish one element from another. A first element may be referred to as a second element, and vice versa.

Figure 3:
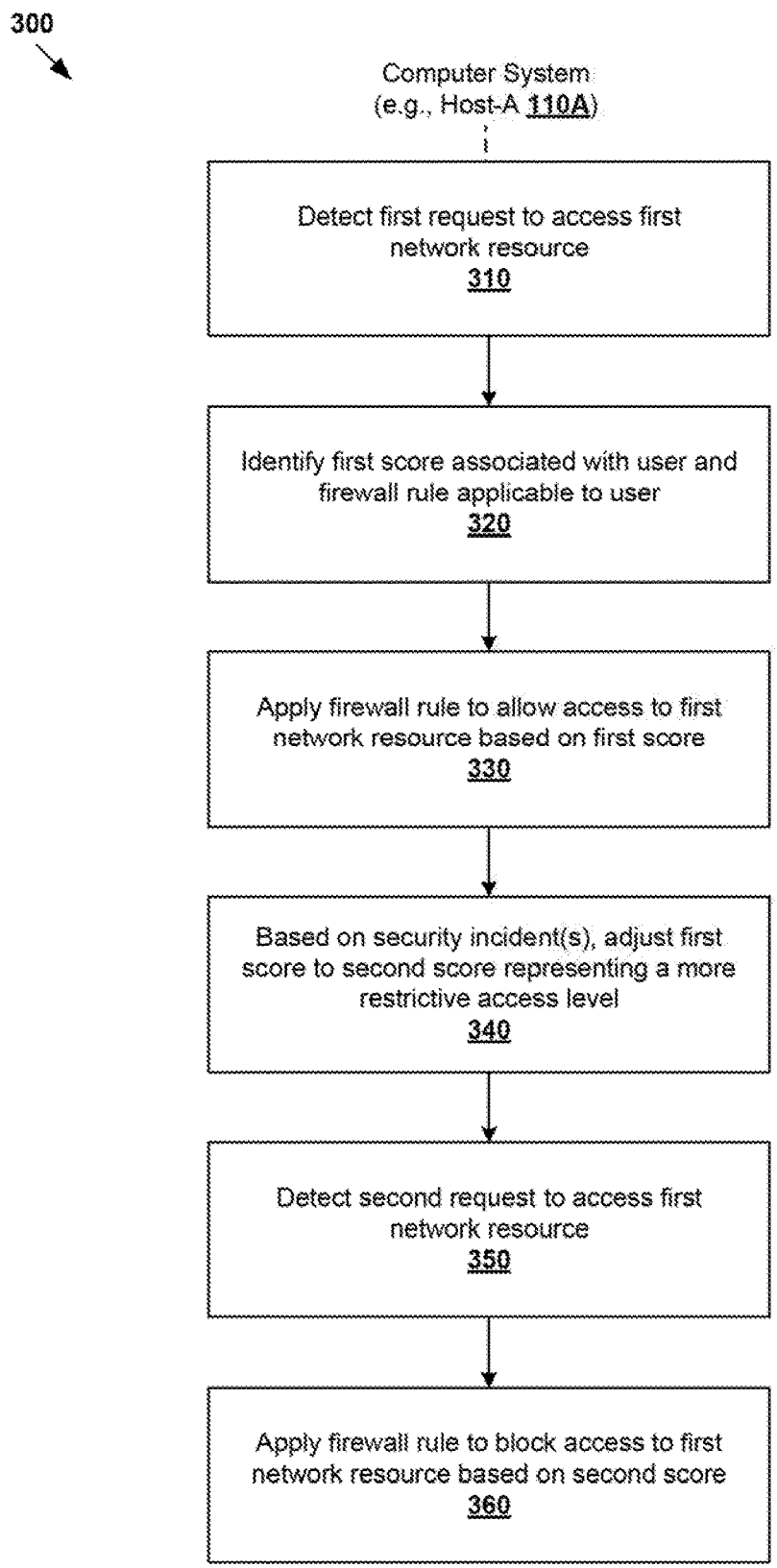
FIG. 3 is a flowchart of an example process for a computer system to perform score-based dynamic firewall rule enforcement in an SDN environment.

At 310, 320 and 330 in FIG. 3, in response to detecting, from VM1 131 associated with user 191, a first request to access a first network resource (e.g., patient record), host-A 110A may identify a first score=100 associated with user 191 and apply a firewall rule to allow access to the first network resource based on the first score. In the example in FIG. 2, firewall rule 285 specifying (source=doctor, destination=patient.record, score >75, action=allow) is applicable user 191 based on any suitable information associated with user 191, such as identity information (e.g., user ID=X), group membership information (e.g., group=doctor), address information (e.g., IP address=IP1 of VM1 131 operated by user 191), etc. Firewall rule 285 may be applied to allow the access based on first score=100. See 210-230, 270 in FIG. 2.

At 340 in FIG. 3, adjusting the first score=100 (see 220) to a second score=70 (see 240) that represents a more restrictive access level compared to the first score. At 350 and 360 in FIG. 3, in response to detecting, from VM1 131 associated with user 191, a second request to access the first network resource (e.g., patient record), host-A 110A may apply the same firewall rule 285 to block access to the first network resource based on second score=70, which fails to satisfy the minimum threshold=100. In this case, since the score is adjusted from 100 to 70, user 191 does not have the required score >75 to access the patient record. In other words, user 191 has lost access to patient records without affecting other members of group=doctor. See corresponding 240-260 in FIG. 2.

As will be described using FIGS. 4-6, host-A 110A may generate and send event information to SDN manager 184 to cause SDN manager 184 to identify security incident(s) associated with user 191. A particular security incident may represent a deviation of user 191 from an access pattern (e.g., common behavior or activities) associated with group=doctor. Depending on the desired implementation, a "security incident" may refer generally to an undesirable activity that potentially affects the security of SDN environment 100. For example, a security incident may be an access to blocked resources (e.g., vulnerable or non-vulnerable), access to blocked information (e.g., database records), access to blocked websites, detection of a malware, etc.

According to examples of the present disclosure, a user's score may be adjusted to dynamically restrict access to different resources in SDN environment. The adjustment may depend on the severity of the security incidents, such as by assigning different penalties to different security incidents, etc. Various examples will be described below.

Detailed Examples

Figure 4:
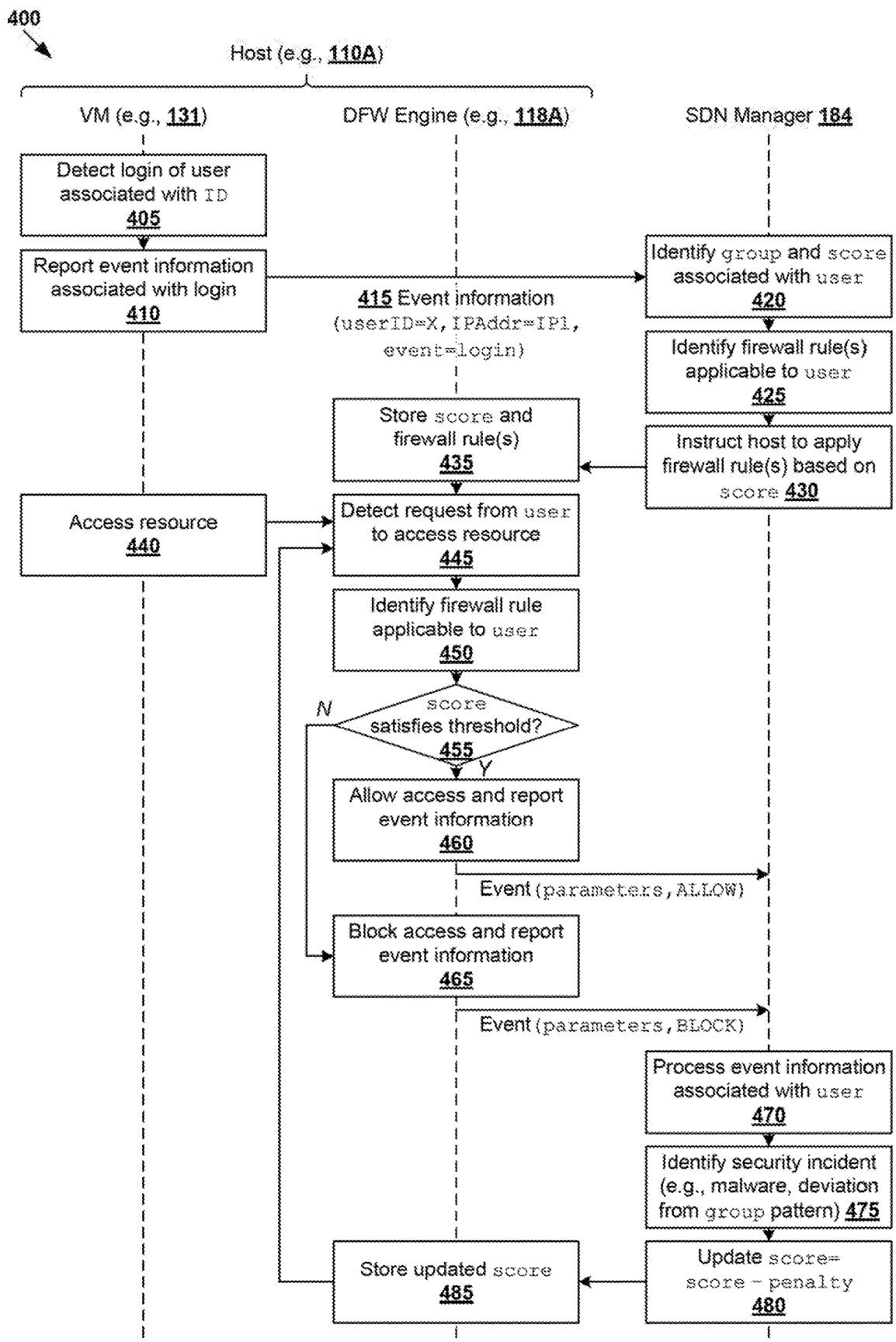
FIG. 4 is a flowchart of an example detailed process for score-based dynamic firewall rule enforcement in an SDN environment.

FIG. 4 is a flowchart of example process 400 of score-based dynamic firewall rule enforcement in SDN environment 100. Example process 400 may include one or more operations, functions, or actions illustrated at 405 to 485. The various operations, functions or actions may be combined into fewer blocks, divided into additional blocks, and/or eliminated depending on the desired implementation. The example in FIG. 4 will be discussed using FIG. 5, which is a schematic diagram illustrating first example 500 of score-based dynamic firewall rule enforcement in SDN environment 100.

(a) Score-Based Firewall Rules

At 405 and 410 in FIG. 4, in response to detecting a login event (see 510 in FIG. 5) associated with user 191 logging into VM1 131, host-A 110A may generate and send event information associated with login event 510 to SDN manager 184. The "event information" (see 415 in FIG. 4) may include any suitable information associated login event 510 and user 191, such as user ID=X, event type=login, IP address=IP1, etc.

In practice, blocks 410-415 may be performed using agent 151 and hypervisor-A 114A. For example, agent 151 (also known as a "thin agent" or "guest agent") may detect login event 510 and report identity information (user ID=X, IP address=IP1) to DFW engine 118A. For example, agent 151 may be configured to capture events (e.g., login, logout, access to resources, etc.) associated with VM1 131. Agent 151 then reports the events to hypervisor 114A (e.g., DFW engine 118A) using a communication channel between VM1 131 and hypervisor-A 114A, such as a Virtual Machine Communication Interface (VMCI) channel, etc. The login process may involve authenticating user 191 using any suitable identity management solution, such as Active Directory™ from Microsoft Corporation, VMware Identity Manager™ from VMware, Inc., etc. For example, user 191 may log into VM1 131 using any suitable Active Directory credentials, such as a user ID, password, etc.

At 420 in FIG. 4, in response to receiving the event information associated with login event 510, SDN manager 184 identifies group=doctor and score=100 associated with user ID=X (see also 270 in FIG. 2). Score=100 may be a maximum score indicating the highest level of trustworthiness or reputation associated with user 191. When assigned with maximum score=100 (see 220 in FIG. 2), user 191 is allowed to access various resources specified by firewall rules 281-286. Score=100 may be assigned to user 191, endpoint VM1 131 operated by user 191, application or process APP1 141 executed by VM1 131, or any combination thereof. Depending on the desired implementation, the score associated with user 191 may be assigned to any additional or alternative software-implemented or logical entity (e.g., VNIC 161, LP 171) associated with VM1 131, etc.

Block 420 may be performed based on identity information 270 maintained by SDN manager 184, such as (group=doctor, user ID=X, IP address=IP1, VM ID=VM1, APP ID=APP1, score=100) for user 191 and (group=doctor, user ID=Y, IP address=IP4, VM ID=VM4, APP ID=APP4, score=100) for user 192. See corresponding 271-272 in FIG. 2. The term "group" may refer generally to a collection of members that can be managed as a single unit, such as doctors, nurses, etc. Using nesting, a group (e.g., doctor) may be a member of another group (e.g., all users).

At 425 in FIG. 4, SDN manager 184 identifies a set of firewall rules that is applicable to user 191. Referring also to FIG. 2, firewall rules 281-286 are identified to be applicable to group=doctor, and therefore to user 191. In practice, block 425 may involve agent 151 sending group and user information to DFW engine 118A, which may then identify firewall rules 281-286 based on group-to-firewall-policy mapping information. At 430 and 435, SDN manager 184 generates and sends control information to instruct host-A 110A to apply firewall rules 281-286 using DFW engine 118A based on score=100 assigned to user 191. Host-A 110A stores firewall rules 281-286 and applies them to packets originating from source IP address=IP1 associated with VM1 131 operated by user 191.

(b) Enforcement Based on First Score=100

At 440, 445 and 450 in FIG. 4, in response to detecting a packet requesting access to a resource from VM1 131, DFW engine 118A identifies a firewall rule that is applicable to the packet. For example, the matching firewall rule may be identified based on packet characteristics (e.g., header information) and/or identity information associated with user 191. At 455, if the score associated with user 191 satisfies a predetermined threshold, an action specified by the firewall rule will be performed. At 460-465, host-A 110A reports event information associated with action=allow or block to SDN manager 184.

At 470 and 475 in FIG. 4, SDN manager 184 may process event information associated with user 191 to identify any security incident. For example, when VM1 131 operated by user 191 is infected with malware or attempts to access a resource that it is not allowed to access, the access pattern of VM1 131 will deviate from that of other members of the same group (e.g., Doctor).

Figure 5:
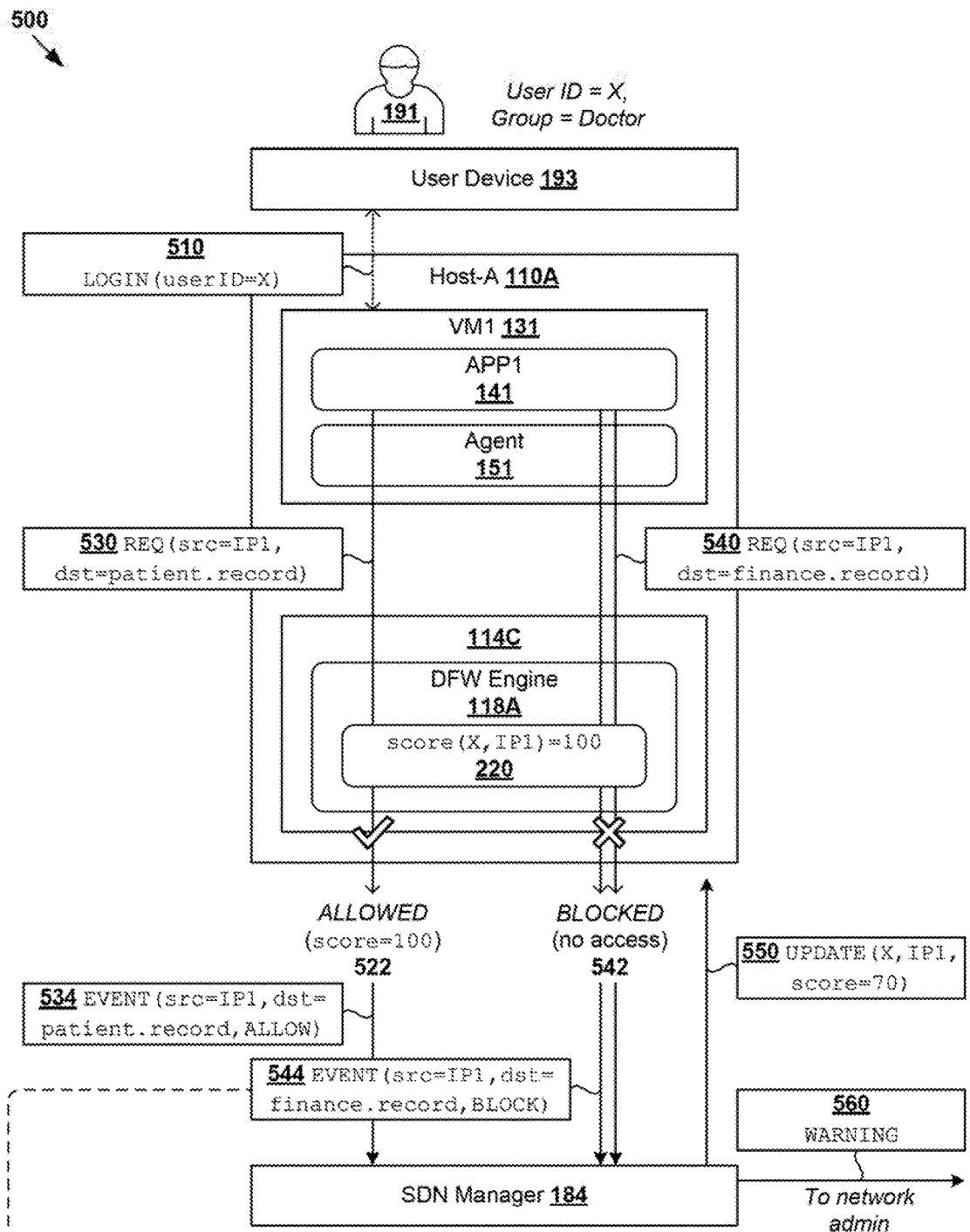
FIG. 5 is a schematic diagram illustrating first example of score-based dynamic firewall rule enforcement in an SDN environment.

A first example is shown at 530, 532 and 534 in FIG. 5. In response to detecting first packet 532 requesting access to a patient record, DFW engine 118A may apply firewall rule 285 in FIG. 2 to allow the access based on score=100 (see 522). Event information 534 specifying (source=IP1, source PN=6003, destination=patient.record, action=allow) is then generated and sent to SDN manager 184.

A second example is shown at 540, 542 and 544 in FIG. 5. Here, user 191 is detected to have made repeated attempts to access to financial records that user 191 is not allowed to access. In this case, various instances of event information 544 specifying (source=IP1, source PN=6003, destination=finance.record, action=block) may be reported to SDN manager 184.

(c) Dynamic Score Adjustment

At 480 in FIG. 4, once a security incident is identified, SDN manager 184 may update the score assigned to user 191 to apply a more restrictive security policy. For example, a penalty (p) may be deducted from the score based on the severity or impact of the security incident. In the example in FIG. 5, the penalty may be calculated using $p=f \times w$, where f=frequency of the security incident, and w=weight associated with the security incident. To reduce the likelihood of false positives, different weights may be used for security incidents with different impacts. SDN manager 184 may support a trust score adjustment module (not shown) to implement block 480.

In the example in FIG. 5, the penalty (p) may be determined based on trust score computation rules 521-524. At

521, if malware is detected, the score assigned to user 191 may be reduced by p=f×5 using w=5. At 522, if financial records are accessed (e.g., during non-working hours), p=f×3 may be applied using w=3. At 523, if a blocked vulnerable resource is accessed, p=f×10 may be applied based on w=10. At 524, if a blocked non-vulnerable resource is accessed, p=f×0.5 may be applied using w=0.5. For example, if f=10 failed attempts made by user 191 to access destination=finance.record are detected and blocked, the total penalty is p=10×3=30, and the updated score is therefore 100−30=70.

Depending on the desired implementation, a "vulnerable" resource may be a port for a SSH session using port 22, FTP session, remote desktop protocol (RDP) session, database access, etc. Access to blocked vulnerable resources is associated with a higher weight (e.g., w=10) and therefore attracts a higher penalty. A "non-vulnerable" resource may include a website on the Internet, which is accessible using HTTP, HTTPS, etc. For example, a possibly accidental access to a blocked website is associated with a lower weight (e.g., w=0.5) and therefore a lower penalty, compared to when blocked vulnerable resources (e.g., w=10) are accessed. If multiple types of security incident are detected, a combination of different penalties may be determined.

Referring to 550 in FIG. 5, since there have been several attempts to access a resource (e.g., financial record) that user 191 is not allowed to access, SDN manager 184 may instruct host-A 110A to reduce the score associated with user 191 from 100 ("first score") to 70 ("second score"). This way, a stricter security policy may be applied on user 191 without affecting other members of group=doctor. Additionally and/or alternatively, a warning or notification (see 560 in FIG. 5) may be generated and sent to a network administrator (or a supervisor of user 191) to flag the security incident.

(b) Enforcement Based on Second Score=70

Figure 6:
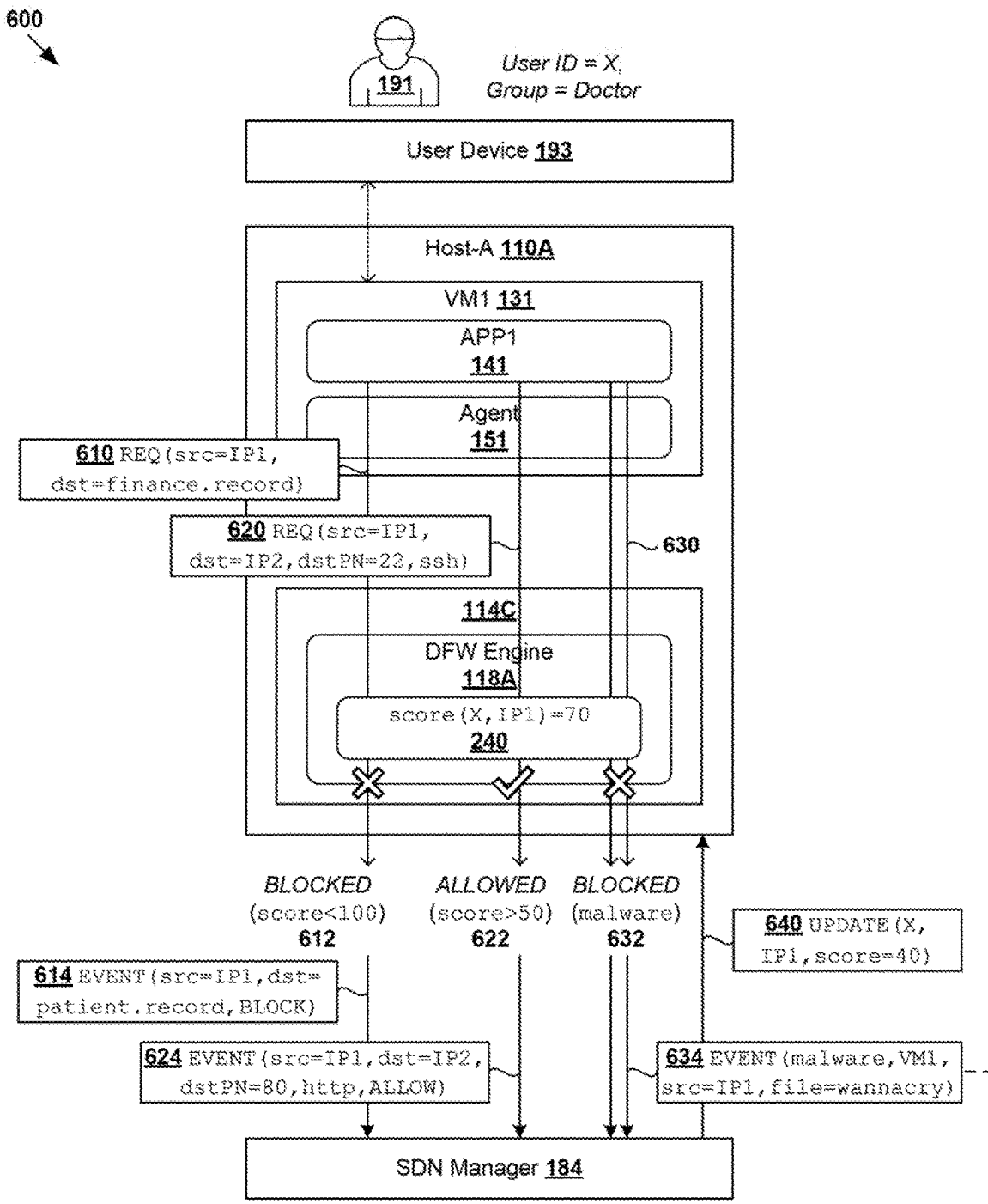
FIG. 6 is a schematic diagram illustrating second example of score-based dynamic firewall rule enforcement in an SDN environment.

More examples are shown in FIG. 6, which is a schematic diagram illustrating second example 600 of score-based dynamic firewall rule enforcement in SDN environment 100. In the example in FIG. 6, since the score associated with user 191 is adjusted from 100 to 70, user 191 loses access to patient records that require minimum score=75 to access. As such, in response to detecting a request to access a patient record, DFW engine 118A may apply firewall rule 285 in FIG. 2 to block the access. Event information specifying (source=IP1, source PN=6003, destination=patient.record, action=block) is then generated and sent to SDN manager 184. See 610, 612 and 614 in FIG. 6.

Although the score is reduced to 70, user 191 may still have access to certain resources, such as Internet websites, etc. For example in FIG. 6, in response to detecting a request to access an external website, DFW engine 118A may apply firewall rule 282 in FIG. 2 to allow the access because score=70 satisfies threshold of 40. Event information specifying (source=IP1, source PN=6003, destination=IP2, destination PN=80, service=HTTP, action=allow) is then generated and sent to SDN manager 184. See 620, 622 and 624 in FIG. 6.

The score associated with user 191 may be further reduced when malware is detected. In the example in FIG. 6, user 191 may attempt to download a file that is flagged as malware by an antivirus system, etc. Here, the term "malware" is used as an umbrella term to cover various forms of hostile or intrusive software, such as viruses, worms, Trojan horse programs, spyware, phishing, adware, riskware, rookits, spams, scareware, ransomware, a combination thereof, etc. Once VM1 131 is infected with a malware, it may generate a lot of network requests on certain ports (e.g., 137, 445), which is a deviation from the access pattern of other users in the same group.

In response to detecting the malware, DFW engine 118A blocks the download and reports event information specifying (malware, VM1, source=IP1, file=wannacry) to SDN manager 184. See 630, 632 and 634 in FIG. 6. Based on event information 634, SDN manager 184 may identify that the access pattern associated with VM1 131 deviates from that of group=doctor. In response to detecting the security incident (i.e., malware), SDN manager 184 may instruct host-A 110A to further reduce the score associated with user 191 from 70 to 40. This has the effect of placing VM1 131 into quarantine. In particular, VM1 131 and user 191 will be blocked from accessing all resources according to firewall rule (source=doctor, destination=any, score 40, action=block); see 281 in FIG. 2. A warning or notification (not shown in FIG. 6) may be generated and sent to a network administrator (or a supervisor of user 191) to flag the malware detection incident. Depending on the desired implementation, the score may be reset once the security incident is reviewed, such as after a security audit is performed by the network administrator, etc.

Although not shown in FIG. 5 and FIG. 6, deep packet inspection may be performed to facilitate score evaluation by SDN manager 184. For example, deep packet inspection may be performed using agent 151 and/or hypervisor-A 114A to inspect operations performed by VM1 131 operated by user 191 and report related event information to SDN manager 182. In response to detecting that user 191 is performing file operations (e.g., copy or delete) that deviate from the access pattern of other members of group=doctor, SDN manager 184 may reduce the score associated with user 191 to lower than 50. This way, file share operations may be blocked according to score-based firewall rule (source=doctor, destination=fileshare on port 445, score >50, action=allow) at 283 in FIG. 2.

Container Implementation

Although explained using VMs 131-134, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-134. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as a host or network management entity may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a host to perform score-based dynamic firewall rule enforcement in a software-defined networking (SDN) environment, wherein the host supports a virtualized computing instance, the method comprising:

in response to detecting, from the virtualized computing instance which is associated with a user, a first request to access a first resource protected within a firewall of the SDN environment:

identifying a first score associated with the user, and a firewall rule that is associated with the firewall and that is applicable to the user based on information associated with the user; and based on the first score, applying the firewall rule to allow access to the first resource;

adjusting the first score to a second score that represents a more restrictive access level compared to the first score, wherein adjusting the first score to the second score is based on an attempted unauthorized access by the user to at least one resource protected within the firewall; and in response to detecting, from the virtualized computing instance associated with the user, a second request to access the first resource:

based on the second score, applying the firewall rule to block the second request to access the first resource.

2. The method of claim 1, wherein adjusting the first score to the second score comprises:

generating and sending event information to a network manager to cause the network manager to identify one or more security incidents associated with the user, wherein a particular security incident represents a deviation of the user from an access pattern associated with a group of which the user is a member.

3. The method of claim 2, wherein adjusting the first score to the second score comprises:

based on an instruction from the network manager, adjusting the first score to the second score based on at least one of the one or more security incidents which include: (a) access to a blocked resource, (b) access to blocked information, (c) access to a blocked website, and (d) detection of a malware executed by the virtualized computing instance.

4. The method of claim 1, wherein adjusting the first score to the second score comprises:

adjusting the first score to the second score based on a penalty associated with one or more security incidents, wherein the penalty associated with a particular security incident is computed based on at least one of: a weight assigned to the particular security incident and a frequency of the particular security incident.

5. The method of claim 1, further comprising:

based on one or more further security incidents, adjusting the second score to a third score that represents a more restrictive access level compared to the second score.

6. The method of claim 1, wherein applying the firewall rule further comprises:

determining whether the first score or the second score satisfies a threshold score required to access the first resource.

7. The method of claim 1, further comprising:

detecting, by an agent supported by the virtualized computing instance, a login event associated with the user; and generating and sending, by the agent, identity information associated with the user to a firewall engine to cause the firewall engine to retrieve from a network manager: (a) the first score which is assigned to the user, the virtualized computing instance associated with the user, or an application supported by the virtualized computing instance, and (b) the firewall rule based on the identity information.

8. A non-transitory computer-readable storage medium that includes a set of instructions which, in response to execution by a processor of a computer system, cause the processor to perform a method of score-based dynamic firewall rule enforcement, wherein the method comprises:
  in response to detecting a first request by a user to access a first resource:
    identifying a first score associated with the user, and a firewall rule that is applicable to the user based at least in part on information associated with the user; and
    based on determination that the first score satisfies a threshold requirement specified by the firewall rule, applying the firewall rule to allow access to the first resource;
  adjusting the first score to a second score that represents a more restrictive access level compared to the first score; and
  in response to detecting a second request by the user to access the first resource:
    based on determination that the second score fails to satisfy the threshold requirement, applying the firewall rule to block the second request to access the first resource.

9. The non-transitory computer-readable storage medium of claim 8, wherein adjusting the first score to the second score comprises:
  generating and sending event information to a network manager to cause the network manager to identify one or more security incidents associated with the user, wherein a particular security incident represents a deviation of the user from an access pattern associated with a group of which the user is a member.

10. The non-transitory computer-readable storage medium of claim 9, wherein adjusting the first score to the second score comprises:
  based on an instruction from the network manager, adjusting the first score to the second score based on at least one of the one or more security incidents which include: (a) access to a blocked resource, (b) access to blocked information, (c) access to a blocked website, and (d) detection of a malware executed by the virtualized computing instance.

11. The non-transitory computer-readable storage medium of claim 8, wherein adjusting the first score to the second score comprises:
  adjusting the first score to the second score based on a penalty associated with one or more security incidents, wherein the penalty associated with a particular security incident is computed based on at least one of: a weight assigned to the particular security incident and a frequency of the particular security incident.

12. The non-transitory computer-readable storage medium of claim 8, wherein the method further comprises:
  based on one or more further security incidents, adjusting the second score to a third score that represents a more restrictive access level compared to the second score.

13. The non-transitory computer-readable storage medium of claim 8, wherein the method further comprises:
  determining whether the first score or the second score satisfies the threshold requirement which is specified by the firewall rule in order to access the first resource.

14. The non-transitory computer-readable storage medium of claim 8, wherein the method further comprises:
  detecting, by an agent supported by a virtualized computing instance of the computer system, a login event associated with the user; and
  generating and sending, by the agent, identity information associated with the user to a firewall engine to cause the firewall engine to retrieve from a network manager: (a) the first score which is assigned to the user, the virtualized computing instance associated with the user, or an application supported by the virtualized computing instance, and (b) the firewall rule based on the identity information.

15. A computer system configured to perform score-based dynamic firewall rule enforcement in a software-defined networking (SDN) environment, wherein the computer system comprises:
  a processor; and
  a non-transitory computer-readable medium having stored thereon instructions that, in response to execution by the processor, cause the processor to:
    in response to detecting, from a virtualized computing instance which is associated with a user, a first request to access a first resource protected within a firewall of the SDN environment:
      identify a first score associated with the user, and a firewall rule that is associated with the firewall and that is applicable to the user based on information associated with the user; and
      based on the first score, apply the firewall rule to allow access to the first resource;
    adjust the first score to a second score that represents a more restrictive access level compared to the first score, wherein adjustment of the first score to the second score is based on an attempted unauthorized access by the user to at least one resource protected within the firewall; and
    in response to detecting, from the virtualized computing instance associated with the user, a second request to access the first resource:
      based on the second score, apply the firewall rule to block the second request to access the first resource.

16. The computer system of claim 15, wherein to adjust the first score to the second score, the instructions, in response to execution by the processor, cause the processor to:
  generate and send event information to a network manager to cause the network manager to identify one or more security incidents associated with the user, wherein a particular security incident represents a deviation of the user from an access pattern associated with a group of which the user is a member.

17. The computer system of claim 16, wherein to adjust the first score to the second score, the instructions, in response to execution by the processor, cause the processor to:
  based on an instruction from the network manager, adjust the first score to the second score based on at least one of the one or more security incidents which include: (a) access to a blocked resource, (b) access to blocked information, (c) access to a blocked website, and (d) detection of a malware executed by the virtualized computing instance.

18. The computer system of claim 15, wherein to adjust the first score to the second score, the instructions, in response to execution by the processor, cause the processor to:
  adjust the first score to the second score based on a penalty associated with one or more security incidents, wherein the penalty associated with a particular security incident is computed based on at least one of: a weight assigned to the particular security incident and a frequency of the particular security incident.

19. The computer system of claim 15, wherein the instructions, in response to execution by the processor, further cause the processor to:
based on one or more further security incidents, adjust the second score to a third score that represents a more restrictive access level compared to the second score.

20. The computer system of claim 15, wherein application of the firewall rule further comprises:
determine whether the first score or the second score satisfies a threshold score required to access the first resource.

21. The computer system of claim 15, wherein the instructions, in response to execution by the processor, further cause the processor to:
detect, by an agent supported by the virtualized computing instance, a login event associated with the user; and
generate and send, by the agent, identity information associated with the user to a firewall engine to cause the firewall engine to retrieve from a network manager: (a) the first score which is assigned to the user, the virtualized computing instance associated with the user, or an application supported by the virtualized computing instance, and (b) the firewall rule based on the identity information.

22. A method for score-based dynamic firewall rule enforcement, comprising:
receiving a packet from a user, wherein the packet corresponds to an access request by the user to a resource protected by a firewall along a datapath of the packet;
associating the packet with an identity of the user;
determining a trust score associated with the user;
identifying a matching firewall rule in the firewall that is applicable to the packet, based at least in part on the identity of the user or on characteristics of the packet;
determining if the trust score associated with the user satisfies a threshold requirement of the matching firewall rule; and
based at least in part of whether the trust score satisfies the threshold requirement of the matching firewall rule, allowing the packet or blocking the packet.

23. The method of claim 22, wherein:
the trust score comprises a first trust score,
the access request comprises a first access request;
the resource comprises a first resource, and
wherein the method further comprises after allowing the packet based on the first trust score having satisfied the threshold:
adjusting the first trust score to a second trust score that represents a more restrictive access level compared to the first trust score, wherein adjusting the first trust score to the second trust score is based on a security incident; and
in response to detecting a second access request by the user to access a second resource protected by the firewall and based on the second trust score, applying the firewall rule to deny the second access request to access the second resource.

24. The method of claim 23, wherein adjusting the first trust score to the second trust score based on the security incident comprises:
determining a frequency of the security incident;
determining a weight associated with the security incident;
determining a penalty based on the frequency and the weight; and
deducting the penalty from the first trust score to obtain the second trust score.

25. The method of claim 23, wherein the user is part of a group of users, and wherein adjusting the first trust score to the second trust score based on the security incident comprises applying a stricter security policy to the user without affecting other users of the group.

* * * * *

UNITED STATES PATENT AND TRADEMARK OFFICE
CERTIFICATE OF CORRECTION

| | | |
|---|---|---|
| PATENT NO. | : 11,240,204 B2 | Page 1 of 1 |
| APPLICATION NO. | : 16/383692 | |
| DATED | : February 1, 2022 | |
| INVENTOR(S) | : Patil et al. | |

It is certified that error appears in the above-identified patent and that said Letters Patent is hereby corrected as shown below:

In the Specification

In Column 4, Line 45, delete the text "119A/119B" therefor.

Signed and Sealed this
Third Day of May, 2022

Katherine Kelly Vidal
*Director of the United States Patent and Trademark Office*